United States Patent [19]

Allsop et al.

[11] Patent Number: 5,136,744
[45] Date of Patent: Aug. 11, 1992

[54] FISHING TOOL

[75] Inventors: Jon I. Allsop, Bellingham, Wash.; Renato F. Paulic, Maple Ridge, Canada

[73] Assignee: Chinook Marine Enterprises, Inc., Bellingham, Wash.

[21] Appl. No.: 646,356

[22] Filed: Jan. 25, 1991

[51] Int. Cl.$^5$ .................................. B25F 1/04
[52] U.S. Cl. ............................ 7/106; 7/130; 7/133; 29/80; 29/123
[58] Field of Search ............... 7/106, 125, 132, 133, 7/170, 127, 129, 130; 29/80; 30/28, 123, 145

[56] References Cited

U.S. PATENT DOCUMENTS

| | | | |
|---|---|---|---|
| 276,793 | 5/1883 | Erdman et al. | 7/132 |
| 612,990 | 10/1898 | Kiefaber | 7/162 |
| 797,576 | 8/1905 | Havell | 30/28 |
| 810,402 | 1/1906 | Friese | 30/28 |
| 994,119 | 6/1911 | Browning | 7/162 |
| 1,001,727 | 8/1911 | Baird | 7/162 |
| 1,338,296 | 4/1920 | Gleerup-Möller | 7/132 |
| 1,363,164 | 12/1920 | Oesterwitz | 30/28 |
| 1,706,581 | 3/1929 | McFarland | 7/162 |
| 1,828,121 | 10/1931 | Adam et al. | 7/162 |
| 2,531,095 | 11/1950 | Williams | 184/16 |
| 2,531,522 | 11/1950 | Malouf | 7/106 |
| 2,611,178 | 9/1952 | Whipple et al. | 30/162 |
| 2,653,332 | 9/1953 | Precious | 7/106 |
| 2,719,995 | 10/1955 | Hohenstein | 29/80 |
| 2,806,229 | 9/1957 | Pletz | 7/132 |
| 2,847,880 | 8/1958 | Neidig | 77/55 |
| 2,977,668 | 4/1961 | Maness | 29/80 |
| 3,172,319 | 3/1965 | Stanfield | 7/106 |
| 3,261,094 | 7/1966 | Bliss | 7/162 |
| 3,315,354 | 4/1967 | Oates, Jr. | 30/28 |
| 3,447,173 | 6/1969 | Kleiman | 7/143 |
| 3,754,290 | 8/1973 | Nicholson | 7/1 H |
| 3,825,961 | 7/1974 | Klein | 7/1 H |
| 4,057,863 | 11/1977 | Bewley | 7/5.4 |
| 4,144,605 | 3/1979 | Eberhardt | 7/106 |
| 4,360,970 | 11/1982 | Ostroski et al. | 30/2 |
| 4,625,386 | 12/1986 | Bieganski | 29/5664 |
| 4,711,031 | 12/1987 | Annello | 30/294 |
| 4,799,326 | 1/1989 | Mertens | 43/4 |

Primary Examiner—Roscoe V. Parker
Attorney, Agent, or Firm—Christensen, O'Connor, Johnson & Kindness

[57] ABSTRACT

A multi-purpose fishing tool to aid in the cutting of line and the maintenance of fish hooks and flies is disclosed. The fishing tool comprises two normally spaced-apart hand grips that are attached to a common flexure assembly. A knife blade is mounted to one of the hand grips and is oriented and directed to abut an anvil surface on the other hand grip. One of the hand grips contains a storage compartment that is normally enclosed by an outer cover of the hand grip. The second hand grip contains a file that can be extended through an opening in the butt end of the hand grip for the actuation of a lever normally seated in a slot in the base of the hand grip. A pin for cleaning the eyelet of flies and hooks is mounted to the frame of the tool.

22 Claims, 3 Drawing Sheets

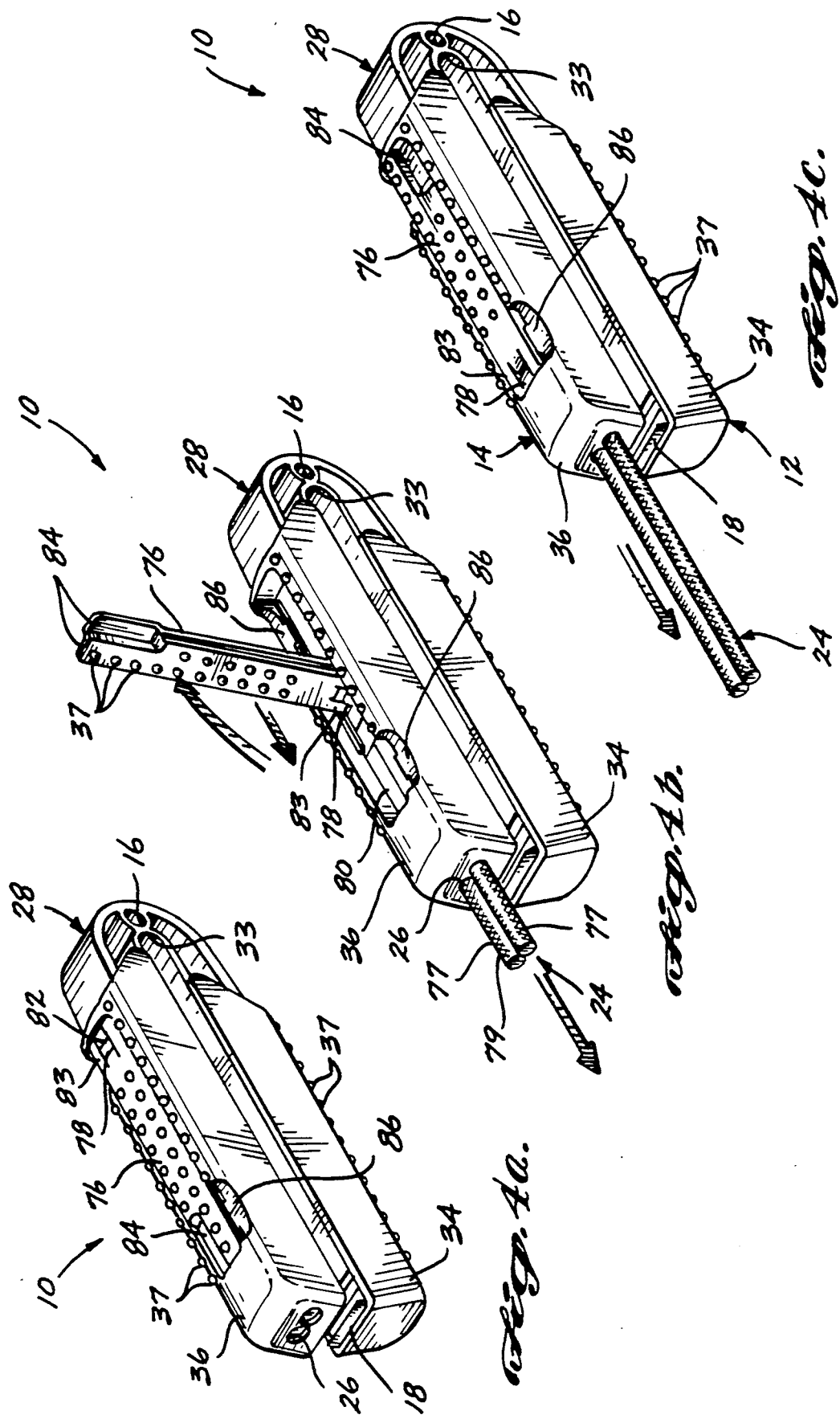

FISHING TOOL

FIELD OF THE INVENTION

This invention relates generally to a tool to aid fishermen, and, more particularly, to a multi-function tool that facilitates line cutting, attachment, removal, storage and maintenance of fishhooks, flies and the like.

BACKGROUND OF THE INVENTION

Fishing requires persons practicing the sport to perform a number of different tasks in order to maximize the possibility of having a successful outing. Some of these tasks are associated with tending to the fishing line which is prone to becoming damaged by tangling, bruising or cutting. When this occurs, fishermen often have to spend time cutting away the damaged sections of line, and cutting off and reattaching hooks, flies, lures and the like to an undamaged section of the line. Also, fishermen need to keep their hooks sharp so as to increase their chances of being able to land fish. This requires the fishermen to frequently file their hooks so that they are always in the appropriate state of readiness. The need to perform these tasks takes away from the time one is able to actually fish and, some believe, serves to detract from the pleasure of the sport. Moreover, some fishermen, such as fly fishermen who fish in mid-stream, must hold their fishing equipment in their hands or under their arms while tending it. This requires these individuals to exercise a degree of concentration and mechanical dexterity that can further detract from the enjoyment of the activity.

There have been some attempts at providing multi-purpose tools to assist fishermen in the repair and maintenance of their equipment. A disadvantage of many of these tools is that while they serve some functions, they are often difficult to use, especially when a person has only one hand to work the tool since the other hand is needed to hold the fishing rod or the portion of line being tended. For example, one known tool requires a person to unsnap and then rotate a lever before the tool can be used to cut line. The same tool also requires a person to place his/her thumbnail in relatively small indentations in order to access the blades that are stored between the upper and lower plates of the tool. These activities require a degree of concentration and an element of time that contributes to the complexity of the fishing process and can reduce the pleasure of the sport.

SUMMARY OF THE INVENTION

This invention comprises a multi-function fishing tool that can be used to cut line, and aid in the insertion and removal of fishhooks, flies, weights, bobbers and the like to and from the line. Only a minimal degree of manual dexterity and time is required to use the individual elements of the tool of this invention so as to make the tool easy to use when one is trying to accomplish a number of tasks.

The fishing tool of this invention is in the form of a U-shaped device that comprises two normally spaced-apart, hollow hand grips that are attached to a common flexure or hinge assembly so that they can be squeezed together. One of the hand grips is provided with a knife blade that is oriented and dimensioned to abut an anvil surface on the opposed hand grip when the grips are squeezed together. One of the hand grips includes a storage compartment under the outer cover of the grip. The other hand grip holds a file that can be extended for use or retracted back into the hand grip for storage.

In a preferred embodiment of this invention, the fishing tool has a frame formed out of an integral piece of material with two spaced-apart inner walls that extend from a common flexure section. Outer covers are secured over each inner wall and are shaped so that, in combination with the associated frame inner wall, they serve as the hand grips. Additional frame wall members are formed adjacent one of the frame inner walls so as to define the storage compartment. The outer cover associated with the storage compartment can be selectively opened or closed so that the storage compartment can be accessed or covered. The second cover, in combination with the associated inner wall, forms a space in which the file is normally stored. A lever, which is linked to the file, allows the file to be extended or retracted. The knife blade is mounted to the end of one of the covers and is oriented and dimensioned to abut an anvil surface on the end of the other cover. A pin is provided in a recessed break in the frame for opening and cleaning fly and hook eyelets.

The fishing tool of this invention can be used to cut line or things, store items such as hooks, flies and weights, sharpen hooks, and clean fly and hook eyelets. The knife blade is used by merely squeezing the hand grips together. A simple, one-stroke motion of the lever is all that is required to extend the file for use or retract it for storage. The eyelets of flies and hooks can quickly be cleaned by simply passing them over the pin point. Hooks, flies and weights can be stored in the compartment so that one does not lose an inordinate amount of time searching for these small items. These features make this tool well suited for use especially when one is also holding a fishing pole and/or trying to tend to a fishing line as quickly as possible.

Moreover the fishing tool of this invention is a relatively compact and lightweight device. With the aid of a coil cord that is passed through an opening formed in the frame, the tool can be worn around the neck of the user so that when needed it is readily available, and when it is not needed, the tool is out of the way and does not interfere with other fishing activities.

Still another advantage of this tool is that when the file is not in use it is stored inside the body of the tool. This minimizes the file's exposure to the elements which reduces the rate at which it can corrode. Most of the remaining elements of the tool of this invention can be formed out of non-corrosive material, so that even with repeated exposure to salt water, there is little possibility the tool will rust. Furthermore, the knife blade of this tool is positioned to abut a surface that functions as a cutting surface yet does not significantly dull the blade. These features of the tool of this invention serve to maximize the useful life of the tool.

BRIEF DESCRIPTION OF THE DRAWINGS

The invention is pointed out with particularity in the claims. The above and further advantages of this invention may be better understood by referring to the following description taken in conjunction with the accompanying drawings, in which:

FIGS. 4a–c c are perspective views of one embodiment of the invention depicting the extension of the file out of one of the hand grips that form the fishing tool of this invention.

DETAILED DESCRIPTION OF THE PREFERRED EMBODIMENT

Figure 1:
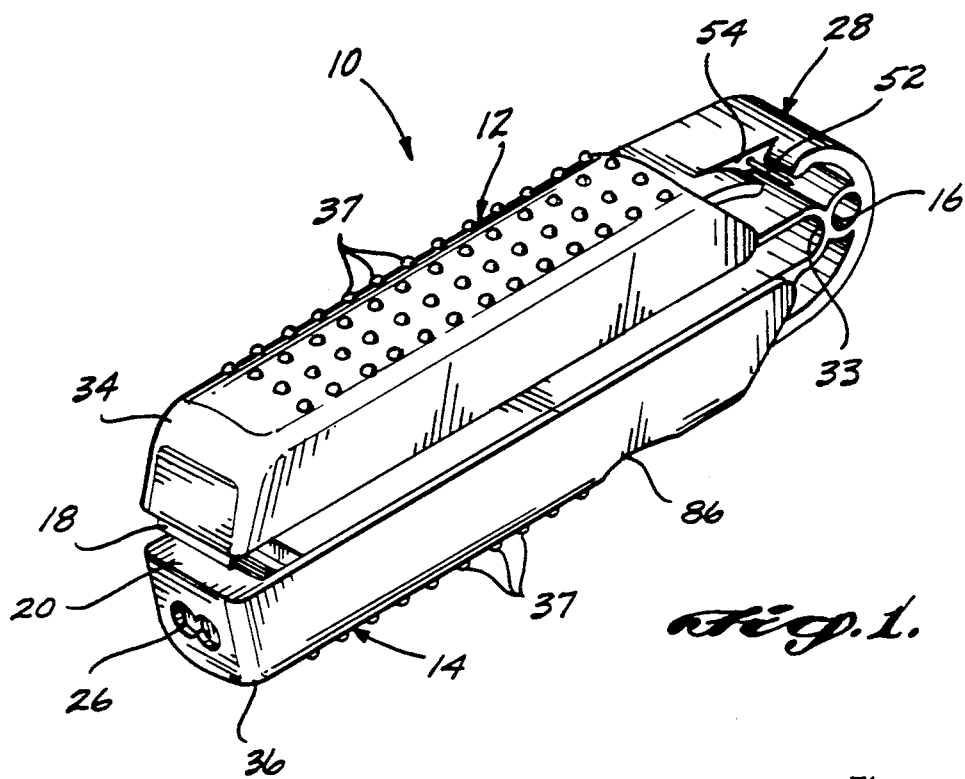
FIG. 1 is a perspective view of a fishing tool constructed in accordance with this invention.
Figure 2:
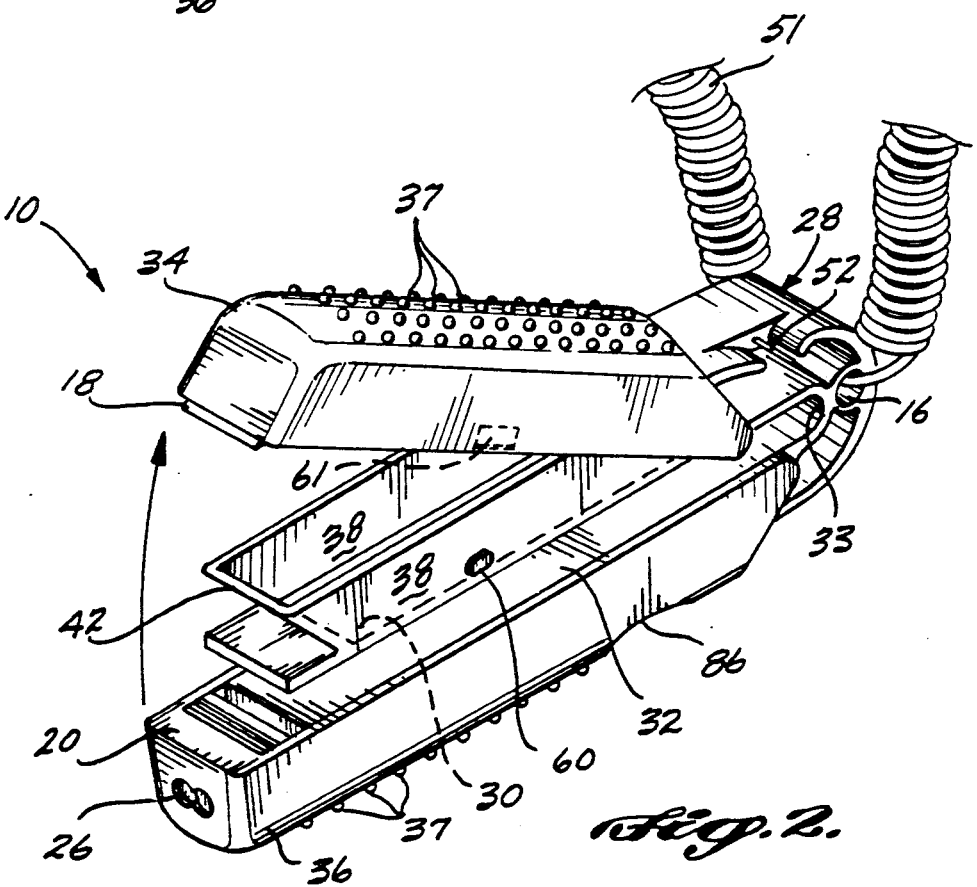
FIG. 2 is a perspective view of the fishing tool depicted in FIG. 1 wherein one of the covers is open so as to illustrate the container that lies therebeneath.

FIGS. 1 and 2 depict a fishing tool 10 constructed in accordance with this invention that comprises a pair of first and second hand grips, 12 and 14 respectively, that are connected to a common hinge assembly 16 so that they can be squeezed together. A knife blade 18 is attached to the end of the first hand grip 12 and is oriented and dimensioned to abut an anvil surface 20 on the opposed portion of the second hand grip 14. The first hand grip 12 also includes a storage compartment 22 that is normally covered. An extendable file 24 (FIG. 3) is normally stored in the second hand grip 14. When needed, the file 24 is extended through an opening 26 formed in the end of the second hand grip 14.

Figure 3:
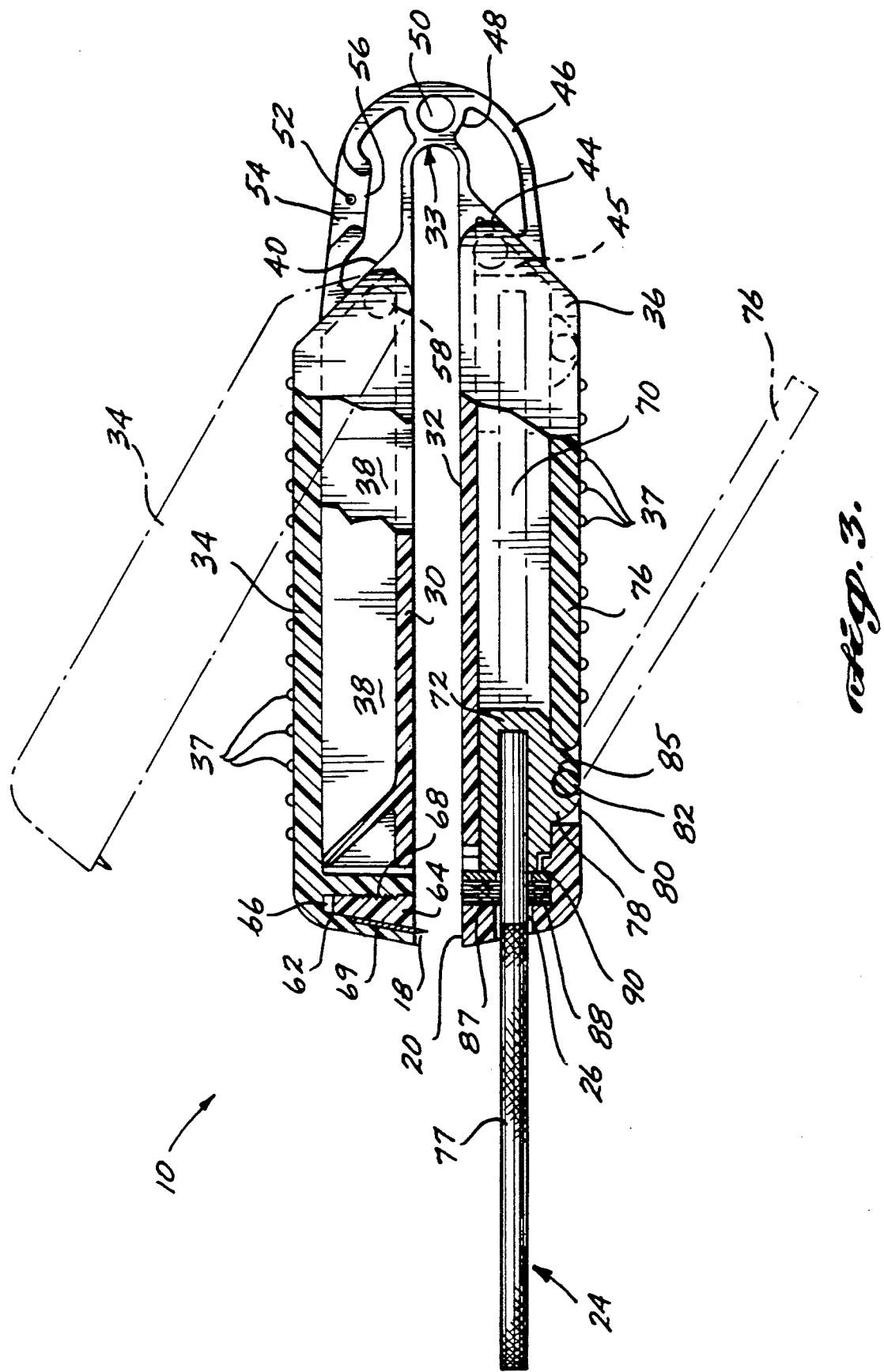
FIG. 3 is a cross-sectional view of the fishing tool depicted in FIG. 1 taken along line 3—3 in FIG. 1 and shows in dashed lines the file extended and retracted, the lever pivoted, and the storage compartment cover open and closed.

As best represented by FIGS. 2 and 3, the fishing tool 10 has a frame 28 formed out of an integral piece of flexible, non-corrosive material such as acetal resin plastic marketed by the duPont Company under the trade name DELRIN II. The frame 28 has a pair of spaced-apart inner walls, 30 and 32 respectively, that are attached to a common U-shaped flexure section 33 that forms the hinge assembly 16. A first cover 34 is disposed over frame inner wall 30 to enclose the storage compartment 22 and serve as the first hand grip 12. A second cover 36 is disposed over frame inner wall 32 so as to enclose the file 24 and serve as the second hand grip 14. A pair of side walls 38, a front wall 40 adjacent the flexure section 33 and a rear wall 42 extend outwards from the frame first inner wall 30 so as to form the storage compartment 22. The rear wall 42 extends out from the frame first inner wall at an angle of approximately 45° in order to facilitate access to the storage compartment 22.

Frame 28 also has an end wall 44 (FIG. 3) that extends outward from the frame second inner wall 32 adjacent the flexure 33. A pair of truncated side walls 45, one shown in phantom in FIG. 3, extend between the frame second inner wall 32 and end wall 44. In the depicted embodiment of the invention, the end wall 44 is marginally closer to the flexure 33 than the opposed front wall 40 associated with the frame first inner wall 30. However, in alternative embodiments of the invention, the storage compartment front wall 40 and the end wall 44 may be equidistant from the flexure 33 or the end wall 44 may be spaced further from the flexure.

A frame outer wall 46 extends from the outer edge of the compartment front wall 40 to the outer edge of the end wall 44. The outer wall 46 is generally U-shaped and is spaced from the inner walls 30 and 32 and the flexure 33. Flexure 33 and the mid-section of the frame outer wall 46 are joined by a pair of symmetrically opposed arcuate sections 48 that also form part of the frame 28. Arcuate sections 48, in combination with the adjacent inner surface of the frame outer wall 46, form a passageway 50 in the frame 28. A cloth covered, circular, elastic coil cord 51, partially shown in FIG. 2, extends through the opening 50. The coil cord 51 allows an individual to wear the tool 10 and his/her neck so that the tool will be readily available when needed.

As is shown in FIG. 3, a pin 52 may be mounted to a tab 54 in the frame outer wall 46 which extends inwards toward the frame first inner wall 30 between the compartment front wall 40 and the flexure 33. The tab 54 is located approximately along the lateral mid-point of the outer wall 46. The outer wall 46 curves around the outer edge of the tab 54 and has a separation 56 adjacent the inner edge of the tab to facilitate the passage of fly and hook eyelets over the pin 52. In a preferred embodiment of the invention, pin 52 extends 150 mils (0.150 inches) above the surface of tab 54, the pin is set back on the tab approximately 90 mils away from the outer surface of the outer wall and the adjacent lateral edge of the frame outer wall 46 is 175 mils above the tab. The recessed placement of the pin 52 and its relatively short length in comparison to the surrounding outer wall 46 enclose the pin head so as to minimize the possibility of a user being pricked by the pin.

The covers 34 and 36 are formed from a resilient plastic material such as acrylontirile-butadiene-styrene. The outer surface of the base of each cover 34 and 36 is formed with outwardly extending projections 37 to facilitate a person's ability to grip and squeeze the tool 10. The first cover 34 is releasably snap-fitted over the storage compartment 22. A pair of opposed, inwardly extending circular projections from the sides of the first cover 34 interlock into complementary indentations in the compartment side walls 38 adjacent the front wall 40 and the frame first inner wall 30 to form hinge assemblies, represented in phantom by circle 58 (FIG. 3.) A pair of oval projections 60, one shown in FIG. 2, on each of the compartment side walls 38 adjacent the frame first inner wall 30 interlock into complementary indentations 61, one shown in phantom in FIG. 2, on the inside side wall of the first cover 34 to secure the cover over the storage compartment 22.

The knife blade 18 is mounted in an opening 62 (FIG. 3) formed in the end of the cover 34 adjacent the free end of the frame first inner wall 30. The knife blade 18 is held in place by a wedge 64 secured in a first section 66 of the opening 62 that has the profile of a truncated triangle. The wedge 64 is held in place by complementary ridges 68 on the wedge and on the adjacent surface of the first cover 34 that defines the opening 62. The knife blade 18 is held in place in a second section 69 of the opening 62 that has a generally rectangular profile by wedge 64 and the adjacent inner surface of the first cover 34 that defines the opening. The knife blade 18 is dimensioned such that its cutting edge abuts an outer portion of the end of the second cover 36 that forms the anvil surface 20 when the hand grips 12 and 14 are squeezed together while the inner end of the knife blade bears against the inside of the first cover 34.

The second cover 36 is snap-fitted to the side walls 38 adjacent the frame second inner wall 32 by hinge assemblies similar to those used to secure the first cover 34 in place. Adhesives may be used to permanently secure the second cover to the frame 28. The second cover 36, in combination with the frame second inner wall 32, defines a space 70 in which the file 24 is normally stored. The file 24 is attached to a plastic file holder 72, also disposed inside space 70, that controls the extension and retraction of the file 24. The movement of the file holder 72, and the extension and retraction of the file 24, is controlled by a lever 76 that is pivotally attached to a hub 78 on the file holder. Both the lever 76 and the file holder hub 78 are seated in an elongate slot 80 formed in the base of the second cover 36. The outer surface of the lever 76 is dimensioned to be flush with the adjacent outer surface of the second cover 36. The lever 76 is also provided with circular projections 37 on its outer surface to further facilitate a person's ability to squeeze the hand grips 12 and 14 together. As seen best in FIGS. 3 and 4a-c, the lever 76 is connected to the file holder hub 78 by a connecting rod 82 that is spaced from the main body of the lever by a pair of longitudinally extending arms 83. The lever connecting rod 82 is snap-fitted into an elongate circular opening 85 formed in the file holder hub 78. The free end of the lever 76 is formed with a pair of opposed steps 84 and the cover 36 is formed with symmetrically opposed indentations 86 adjacent the slot 80 to facilitate thumb or finger insertion needed to pivot the lever so that the file 24 can be extended and retracted.

The file 24 is actually composed of two parallel file elements 77. Each file element 77 is a cylindrical section of metal formed with a set of teeth 79 that define a helix along the length of the element. The file elements 77 are secured together by an epoxy cement that is applied to the ends of the elements.

The closed end of the second cover 36 is formed with the opening 26 through which file 24 is extended and retracted. In the illustrated embodiment of the invention, opening 26 is in the form of two overlapping circles so that the individual file elements 77 that form the file 24 can be extended and retracted therethrough. Referring to FIG. 3, it can be seen that the second cover 36 also defines a space 87 between its closed end and the free end of the frame second inner wall 32 in which an oil-carrying pad 88 may be located for lubricating and cleaning the file 24. In a preferred embodiment of the invention, a felt washer that has been soaked in oil functions as the oil-carrying pad 88; the washer is positioned so that the file 24 extends through the opening formed in the washer. One preferred oil for coating the file 24 is marketed by CRC Industries under the trade name SP-250. Other oils, which are capable of inhibiting corrosion of the file 24 may, of course, be used to coat the file. A plastic washer 90 is positioned against the oil-carrying pad 88. The oil-carrying pad 88 and the washer 90 are held in place by the file 24 which extends through the central openings of these elements. The second cover 36 is formed with an inwardly extending tab 92 that further blocks movement of the pad 88 and washer 90.

In the depicted embodiment of the invention, the second cover 36 is formed with a flat surface between the pad and washer space 87 and its butt end. This surface functions as the anvil surface 20 against which the cutting edge of the knife blade 18 abuts.

As depicted in FIG. 4a, the file 24 is stored inside the second cover with the free end of the lever 76 and its opposed steps 84 positioned near the cutting end of the tool 10. When the file 24 is to be used, the lever 76 is pivoted upwardly so that the file can be extended out of the opening 26, as shown in FIG. 4b. The file 24 can then be held in the fully extended position by locking the lever 76 in the second cover 36 so that the free end of the lever is positioned near the cutting end of the tool 10 as depicted in FIG. 4c. The file is retracted for storage by reversing the procedure that was used to extend it.

The fishing tool 10 of this invention can be used to accomplish a number of tasks fishermen need to perform, and allows them to be performed with a minimal amount of effort. All that is necessary to use the knife blade 18 is to simply press the hand grips 12 and 14 together. The file 24 can be accessed by a simple one-stroke motion of inserting a thumb into the step 84 formed in the lever and the indentation 86 formed in the second cover 36, sliding the file holder 72 with the lever, and then flipping the lever backwards so as to lock the file in place. A fishhook is sharpened by simply running the hook between the separate file elements 77 the form the file 24; both sides of the hook will be sharpened simultaneously by the individual file elements. This eliminates the need to have to first sharpen one side of the hook and then the other side. The pin 52 is readily accessible for cleaning fly or hook eyelets. The storage compartment 22 provides space inside the tool for storing hooks, flies, sinkers and the like that fishermen often need to attach to the end of the lines. Thus, the tool 10 makes it possible for a fisherman to perform a number of tasks with a minimal amount of concentration and a minimal amount of time. These features also make the tool 10 well suited for use when a fisherman is also holding a fishing pole and/or is desirous of returning the hook to water as quickly as possible.

Furthermore, the tool 10 of this invention is both light in weight and compact in size. These features of the tool 10, in combination with the coil cord 51 allows the tool 10 to be worn close to the chest of the user so that when it is not needed it does not interfere with other activities yet remains readily accesible when needed.

Most of the components of the fishing tool 10 are formed from non-corrosive materials. The largest metal component, the file 24, is normally contained inside space 70 which minimizes its exposure to corrosive agents in the environment such as salt water. Also, the knife blade 18 abuts an anvil surface 20 formed of a material that will not deform, so that articles placed thereon can be cut and yet it will not dull the knife blade. These features of the invention serve to maximize the useful life of the tool 10.

Still another advantage of the tool 10 is that the oil-carrying pad 88 cleans the file 24 each time it is extended and retracted. This lubrication serves both to simplify the effort required to sharpen hooks and to further minimize the corrosion of the file 24.

This description is for the purposes of illustration only. Alternative embodiments of this invention are possible without departing from the scope of the claims. For example, in some versions of the invention it may not be necessary to provide the tool 10 with the oil-embedded pad 88. Moreover, it is not always necessary that the knife blade be carried on the tool inside the hand grip opposite the grip in which the file is contained; in some embodiments of the invention the knife blade may be mounted on the same side as the file. It is also possible to provide the tool of this invention with other features and functions without departing from the scope of the claims. For example, it may be desirable to provide the two opposed interior walls with curved indentations so that ball shot which are normally formed with an open wedge can be compressed together such that the wedge with its closure will squeeze down over the line to which it is to be attached. Also, in some embodiments of the tool 10 the anvil surface 20 may be formed out of a separate element that is secured to the hand grip with which it is associated.

Therefore, it is the object of the appended claims to cover all such variations and modifications as come within the true scope and spirit of the invention.

The embodiment of the invention in which an exclusive property or privilege is claimed are defined as follows:

1. A fishing tool comprising:
   a generally U-shaped frame comprising two spaced-apart inner walls attached to a U-shaped flexure, said frame formed of an integral piece of material;
   first and second covers, each said cover disposed over a separate one of said frame inner walls such that each cover and associated frame inner wall forms a handgrip;
   a knife blade on a first one of said handgrips and an anvil surface on the other of said handgrips, wherein said knife blade is oriented and positioned to abut said anvil surface when said handgrips are squeezed together; and
   a file disposed in one of said handgrips and adapted to be moved from a stored position to an extended position.

2. The fishing tool of claim 1, wherein said covers are formed separately from said frame and are attached to said frame.

3. The fishing tool of claim 1, wherein said file is composed of two parallel file elements wherein each said file element is in the form of a cylinder with teeth formed on the outer surface thereof, and said file elements are affixed together at least one end.

4. The fishing tool of claim 1, wherein each said cover extends beyond said frame inner wall with which said cover is associated and said knife blade is mounted to one of said covers and said anvil surface is disposed on said other cover opposite said knife blade.

5. The fishing tool of claim 4 wherein a pair of sidewalls, and a front wall and a rear wall are attached to a first one of said frame inner walls so as to form a storage compartment and said cover associated with said frame first inner wall is releasably secured to said side walls over said storage compartment.

6. The fishing tool of claim 4 wherein said file is disposed in a space between one of said frame inner walls and said cover associated therewith, said file is attached to a file holder also disposed in said space, a lever is pivotally attached to said file holder for extending and retracting said file, and said lever is normally seated in a slot formed in said cover.

7. The fishing tool of claim 5 wherein said file is disposed in a space between a second of one of said frame inner walls and said cover associated therewith, said file is attached to a file holder also disposed in said space, a lever is pivotally attached to said file holder for extending and retracting said file and said lever is normally seated in a slot formed in said cover.

8. The fishing tool of claim 5 wherein said frame further includes: an outer wall disposed around said frame inner walls and said flexure, and connected to said frame inner walls by at least one intermediate wall; a tab integral with said frame outer wall and directed to one of said frame inner walls; and, a pin mounted to said tab.

9. The fishing tool of claim 7 wherein said frame further includes: an outer wall disposed around said frame inner walls and said flexure and connected to said frame inner walls by at least one intermediate wall; a tab integral with said frame outer wall and directed to one of said frame inner walls; and, a pin mounted to said tab.

10. The fishing tool of claim 9 wherein said file is composed of two parallel file elements wherein each said file element is in the form of a cylinder with teeth formed on the outer surface thereof, and said file elements are affixed together at least one end.

11. The fishing tool of claim 9 wherein said frame is formed with an opening and a cord is disposed in said opening.

12. The fishing tool of claim 6 further including an oil-carrying pad disposed in said cover under which said file is stored, said oil-carrying pad is disposed in a space in said cover adjacent an opening formed in said cover through which said file is extended and retracted such that when said file is extended and retracted said file abuts said oil-embedded pad.

13. The fishing tool of claim 9 further including an oil-carrying pad disposed in a space in said second adjacent an opening formed in said cover through which said file is extended and retracted such that when said file is extended and retracted said file abuts said oil-embedded pad.

14. The fishing tool of claim 13 wherein said frame, said covers, said anvil surface, said file holder and said lever are formed from plastic material.

15. A fishing tool, comprising:
    a generally U-shaped frame formed of an integral piece of material comprising two spaced-apart inner walls attached to a U-shaped flexure and a pair of sidewalls, a front wall and a rear wall attached to one of said frame inner walls to define a storage compartment;
    first and second covers, each said cover disposed over a separate one of said frame inner walls such that each said cover and frame inner wall pair forms a handgrip, wherein said cover disposed over said frame inner wall associated with said storage compartment is releasably secured to said sidewalls over said storage compartment; and
    a knife blade on a first one of said handgrip and an anvil surface on a surface of said other of said handgrips, wherein said knife blade is oriented and positioned to abut said anvil surface when said handgrips are squeezed together.

16. The fishing tool of claim 15, further including a file attached to one of said handgrips.

17. The fishing tool of claim 16, wherein said file is located in said handgrip that does not include said storage compartment.

18. The fishing tool of claim 17, wherein said file is mounted in said handgrip to have a first, stowed position wherein said file is located in said handgrip and a second, exposed position wherein said file is extended away from said handgrip.

19. The fishing tool of claim 15, wherein said covers are formed separately from said frame and are attached to said frame.

20. The fishing tool of claim 15, wherein each said cover extends beyond said frame inner wall with which said cover is associated and said knife blade is mounted to one of said covers and said anvil surface is disposed on said other cover opposite said knife blade.

21. The fishing tool of claim 20 wherein said frame further includes an outer wall disposed around said frame inner walls and said flexure, and connected to said frame inner walls by at least one intermediate wall; a tab integral with said frame outer wall and directed to one of said frame inner walls; and, a pin mounted to said tab.

22. The fishing tool of claim 15, wherein said frame, said covers, and said anvil surface are formed from plastic material.

* * * * *